United States Patent [19]
Seo

[11] Patent Number: 5,959,758
[45] Date of Patent: Sep. 28, 1999

[54] TWO-DIMENSIONAL OPTICAL DEFLECTING DEVICE

[75] Inventor: Shuzo Seo, Saitama, Japan

[73] Assignee: Asahi Kogaku Kogyo Kabushiki Kaisha, Tokyo, Japan

[21] Appl. No.: 09/010,920

[22] Filed: Jan. 23, 1998

[30] Foreign Application Priority Data

Jan. 28, 1997 [JP] Japan ................................ P09-028355

[51] Int. Cl.$^6$ .................................................. G02B 26/08
[52] U.S. Cl. ......................... 359/198; 359/199; 359/214; 359/221; 359/226; 359/872
[58] Field of Search .................... 359/196–226, 359/871, 872, 874; 347/256, 257–260

[56] References Cited

U.S. PATENT DOCUMENTS 3,942,879  3/1976  Pledger ................................. 359/226
5,754,327  5/1998  Masotti et al. ......................... 359/199

*Primary Examiner*—James Phan
*Attorney, Agent, or Firm*—Greenblum & Berstein, P.L.C.

[57] ABSTRACT

An optical deflecting device has a supporting member and a deflecting member. The supporting member is provided with an opening. The arced inner surface of the opening corresponds to spherical annulus. The deflecting member has an arced ring-shaped wall and a plane mirror. The arced ring-shaped wall is in slidable contact with the arced inner surface of the opening. Driving mechanisms are provided on each of two perpendicular axes. The point of intersection of the two axes being a center of the spherical annulus. The driving mechanisms rotate the deflecting member around the two axes.

17 Claims, 6 Drawing Sheets

TWO-DIMENSIONAL OPTICAL DEFLECTING DEVICE

BACKGROUND OF THE INVENTION

1. Field of the Invention

The present invention relates to an optical deflecting device used in an optical scanner of a light scanning unit and so on.

2. Description of the Related Art

Conventionally, there is known an optical deflecting device in which a polygon mirror, a galvano-mirror, or hologram scan are used as a deflecting mechanism which deflects a light beam outputted from a light source. In the deflecting device, a mirror or hologram is provided on a rotating mechanism, which rotates around one axis, and the light beam is deflected by operating the rotating mechanism. Accordingly, the light beam only scans in one-dimension and does not scan in two-dimension.

In such a deflecting device, in order for the light beam to scan in two-dimensions, extra structures are required. Using a polygon mirror, it is required that the angles of inclination of the mirrors relative to an axis of rotation should be different. In the hologram scan, it is required that a rotating circular plate comprises a plurality of areas on which different holograms are provided. Further, if it is required that the two-dimensional scanning should be controlled more accurately, the deflecting mechanism should comprise both a polygon mirror and a hologram scan. Namely, the structure of the deflecting device becomes large and complicated. Further, a number of scanning lines is limited by a number of mirrored surface or holograms.

SUMMARY OF THE INVENTION

Therefore, an object of the present invention is to provide an optical deflecting device having a simple structure, which can perform an accurate two-dimensional scanning.

In accordance with an aspect of the present invention, there is provided a two-dimensional optical deflecting device comprising: an optical deflecting member having an arced wall portion, consisting of a spherical annulus, an origin of which is a point of intersection of two axes, and a light beam reflecting portion; a supporting member having an opening portion with which the wall portion of the optical deflecting member is in slidable contact; and driving mechanisms being provided on each of the two axes. The driving mechanisms control a position of the optical deflecting member.

Each driving mechanism comprises a magnet located in the optical deflecting member, and a yoke and a coil located in the supporting member. The coil is placed in a magnetic flux formed between the magnet and the yoke. The driving mechanisms control the location of the optical deflecting member around the two axes. The two axes are horizontally perpendicular. The light beam reflecting portion is a plane mirror. A light beam is directed onto and reflected by the plane mirror at the point of intersection. The driving mechanisms are placed equidistantly from the point of intersection. Two the driving mechanisms are provided on each of the two axes. The curvatures of the magnet and the yoke are coincident with the curvature of the annulus, the plane mirror is circular, and the arced wall portion is ring-shaped.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
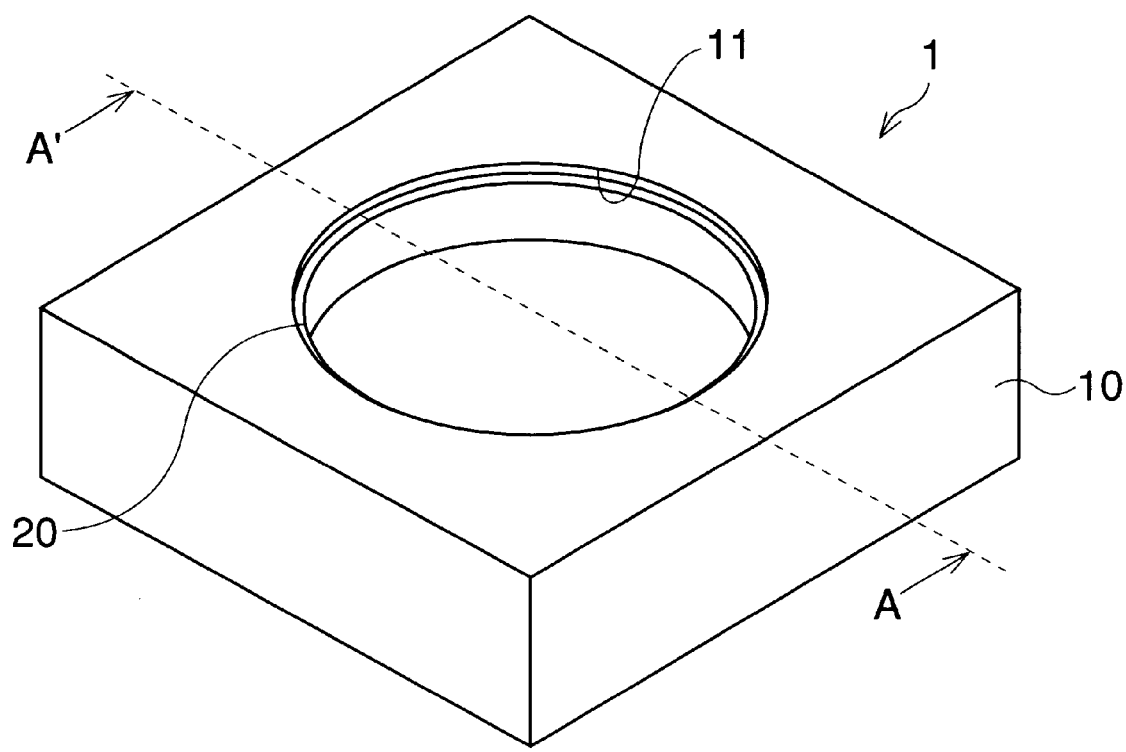
FIG. 1 is a perspective view of an optical deflecting device.

The present invention will now be described with reference to the embodiment shown in the drawings.

FIG. 1 is a perspective view of an optical deflecting device of an embodiment according to the present invention. The optical deflecting device 1 has a supporting member 10 and a deflecting member 20. The supporting member 10 has a figure of parallelepiped, and is provided with an opening 11. The deflecting member 20 is in slidable contact with the arced inner surface of the opening 11.

Figure 2:
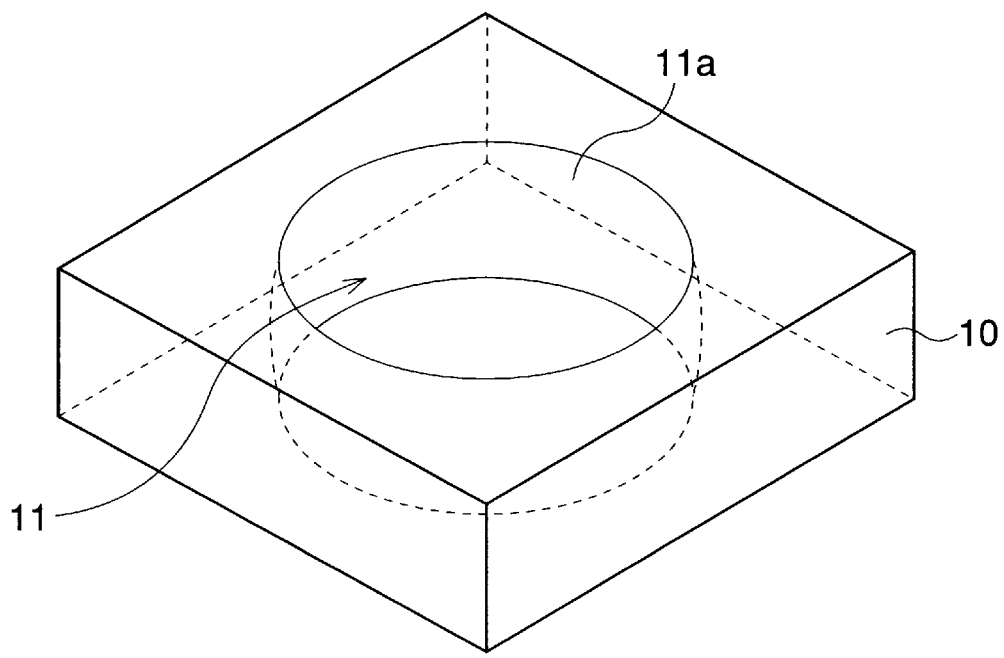
FIG. 2 is a perspective view of a supporting member.
Figure 3:
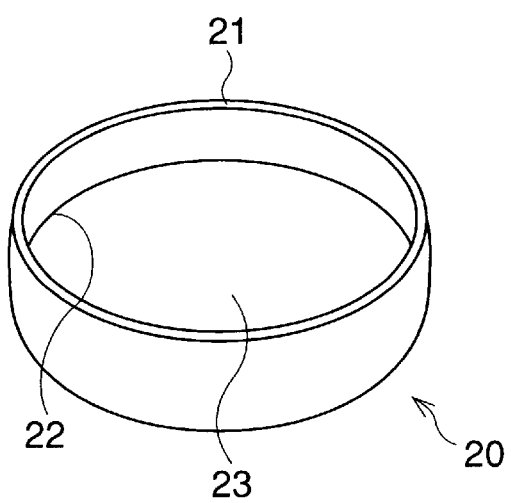
FIG. 3 is a perspective view of a deflecting member.

FIG. 2 is a perspective view of the supporting member 10, and FIG. 3 is a perspective view of the deflecting member 20. The arced inner surface 11a of the opening 11, provided in the supporting member 10, corresponds to an arc of a sphere, so as to be coincident with a spherical annulus. A horizontal cross-section of the supporting member 10, perpendicular to a tangent on the mid-point of the arced inner surface 11a, provides for the opening 11. When a horizontal section of the supporting member 10 is taken along a plane, perpendicular to a tangent on the mid-point of the arced inner surface 11a and which includes the origin of the spherical annulus being coincident with the curvature of the inner surface 11a, the opening 11, in the plane of the section, has the greatest diameter. Further, when the plane is above and below the origin, the diameter of the opening 11 is shorter.

The deflecting member 20 has an arced ring-shaped wall 21 and a circular plate 22. The arced ring-shaped wall 21 is provided around and integrally formed with the edge portion of the circular plate 22. Further, the outer surface of the arced ring-shaped wall 21 has a curvature which is coincident with the arced inner surface 11a of the opening 11, enabling the arced ring-shaped wall 21 to be in slidable contact with the arced inner surface 11a.

Figure 4:
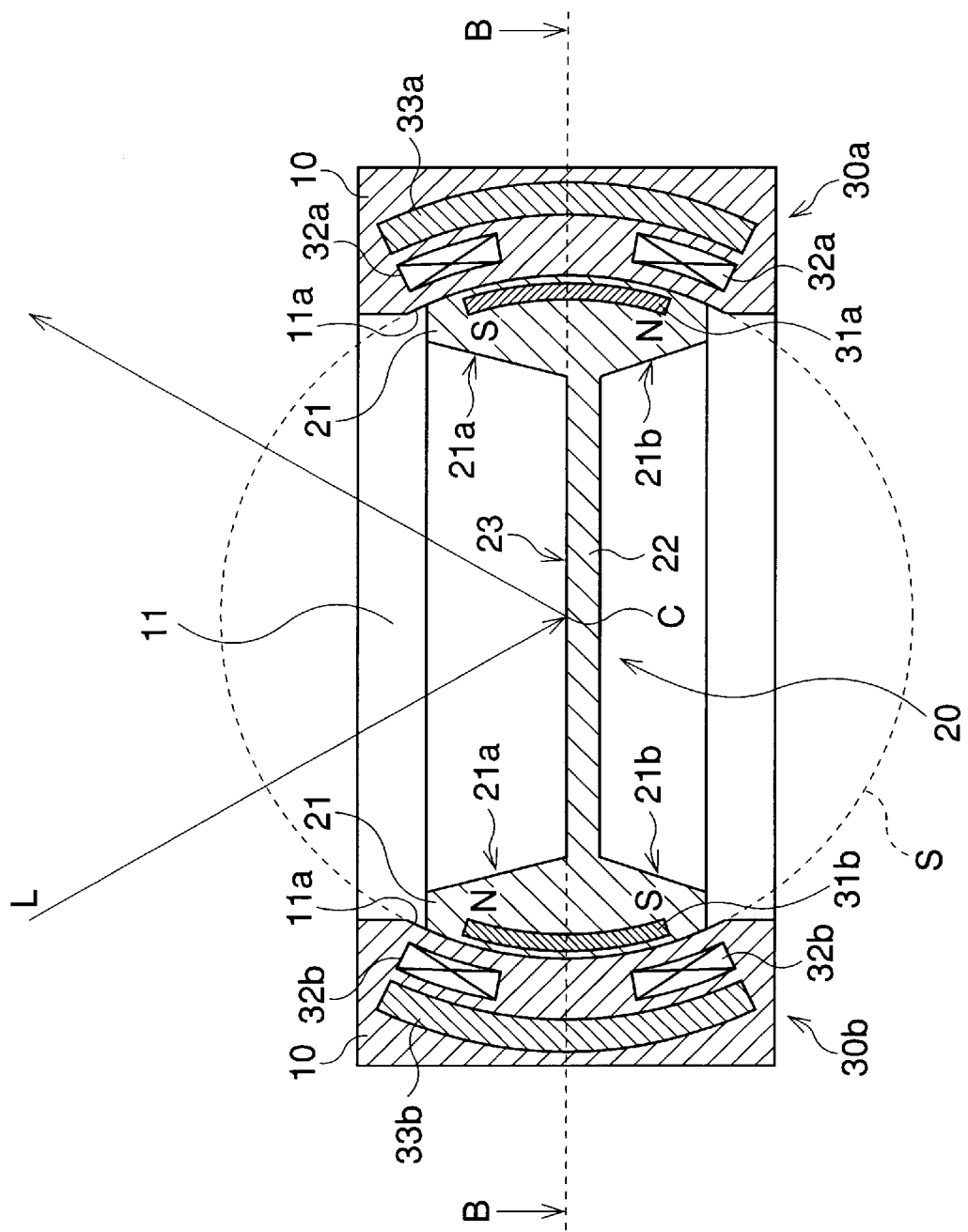
FIG. 4 is a sectional view of the optical deflecting device.

FIG. 4 is a sectional view taken, in the direction of the arrows, along the line A–A' of FIG. 1. Both the arced inner surface 11a of the opening 11 of the supporting member 10 and the outer surface of the arced ring-shaped wall 21 of the deflecting member 20, have a curvature which corresponds to the outer surface of a sphere S. The section of the deflecting member 20 is approximately H-shaped. A ring-shaped inner surface 21a and a ring-shaped inner surface 21b taper to meet the circular plate 22. Further, a plane mirror 23 is provided on one surface of the circular plate 22, in such a manner that the plane mirror 23 is coincident with a plane on which the origin of the sphere S lies.

As shown in FIG. 4, a driving mechanism 30a is provided at the right side of the deflecting member 20. The driving mechanism 30a has a magnet 31a located in the arced ring-shaped wall 21, with a coil 32a and a yoke 33a, which is a plate made of metal, being located in the supporting member 10. The coil 32a is positioned between the magnet 31a and the yoke 33a, and is long enough to enable the plane mirror 23 to be driven. Further, the magnet 31a and the yoke 33a have a curvature coincident with the outer surface of the sphere S. Similarly, a driving mechanism 30b is provided at the left side of the deflecting member 20. The driving mechanism 30b has a magnet 31b located in the arced ring-shaped wall 21, with a coil 32b and a yoke 33b, which is a plate made of metal, being located in the supporting member 10. Further, the coil 32b is positioned between the magnet 31b and the yoke 33b, and is long enough to enable the plane mirror 23 to be driven. The magnet 31b and the yoke 33b have a curvature coincident with the outer surface of the sphere S.

Figure 5:
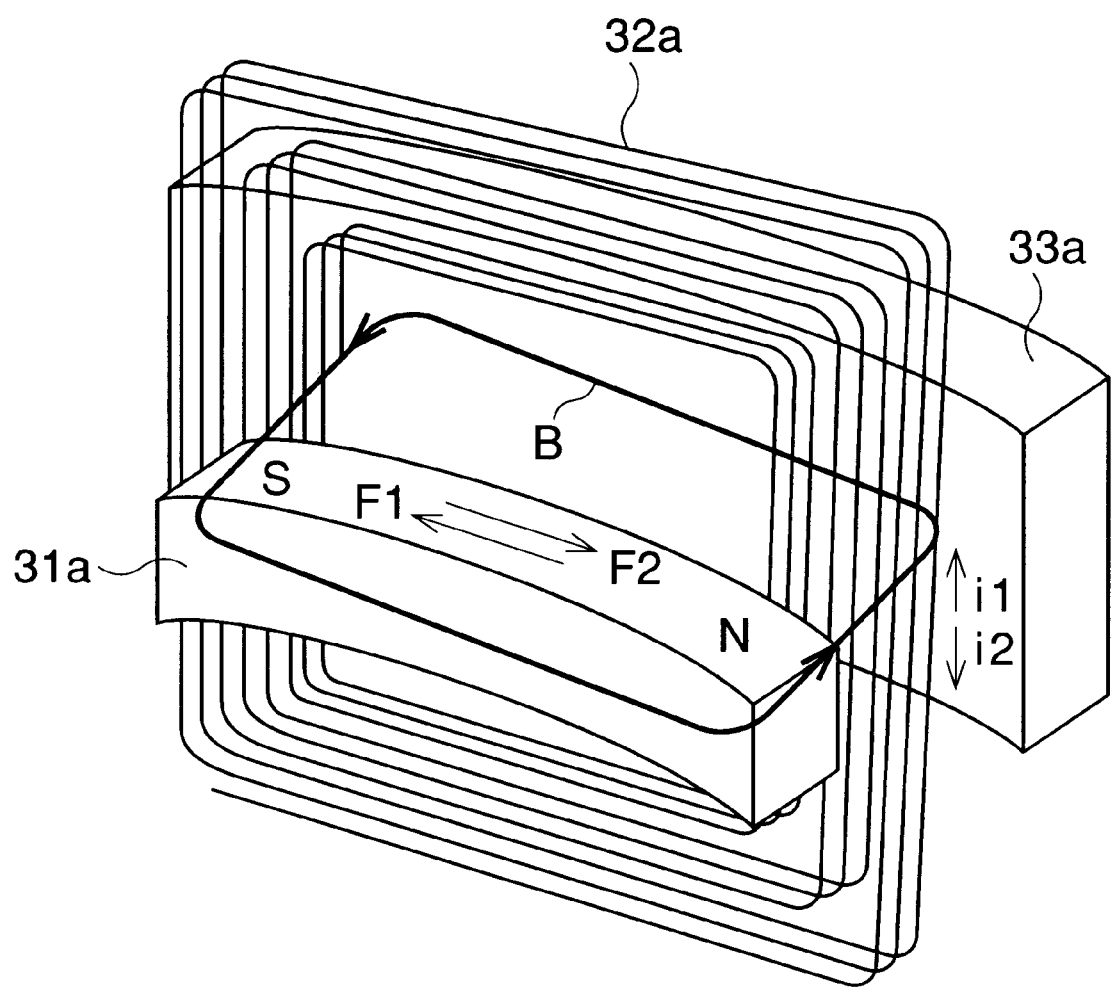
FIG. 5 shows a relationship between an electromagnetic force and elements of a driving mechanism: a magnet, a coil and a yoke.

FIG. 5 shows a relationship between a magnetic flux density in the driving mechanism 30a, a current flowing through the coil 32a and induced electromagnetic forces. The coil 32a is positioned in the magnetic flux, between the magnet 31a and the yoke 33a, so that a magnetic flux density B acts on the coil 32a. When a current flows through the coil 32a in the direction i1, an induced electromagnetic force acts on the coil 32a, in the direction F1. In the driving mechanism 30a, the coil 32a is fixed in the supporting member 10. On the other hand, the magnet 31a is located in the deflecting member 20 which is in slidable contact with the supporting member 10. Accordingly, an equal and opposite force, in the direction F2, acts on the magnet 31a. On the contrary, when the current flows through the coil 32a in the direction i2, an induced electromagnetic force acts on the coil 32a, in the direction F2, and generating a force in the direction F1 on the magnet 31a.

Figure 6:
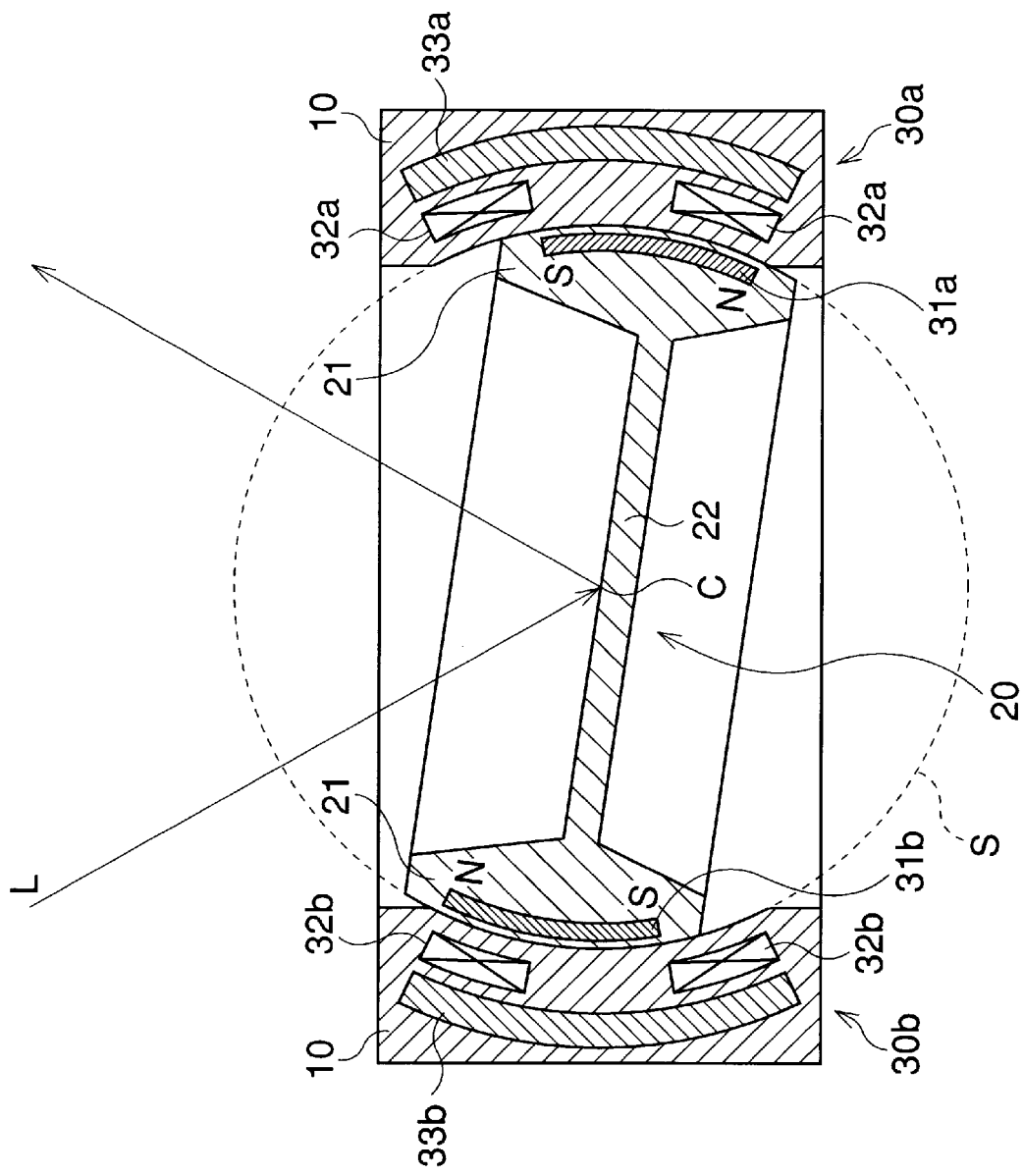
FIG. 6 is a sectional view of the optical deflecting device.

As described above, the magnets 31a and 31b are located in the arced ring-shaped wall 21 of the deflecting member 20, and the deflecting member 20 is slidably supported in the opening 11 of the supporting member 10. Accordingly, when a current flows through the coil 32a and the coil 32b in a predetermined direction, the deflecting member 20 is rotated clockwise or counterclockwise around a center C, shown in FIG. 4 and corresponding to the origin of the sphere S, by the forces generated in the driving mechanism 30a and the driving mechanism 30b. For example, when, in the driving mechanism 30a, the current flows through the coil 32a in the direction i1, the deflecting member 20, in FIG. 4, is rotated clockwise and is stopped at a position shown in FIG. 6.

Accordingly, by controlling the direction and magnitude of the current flowing through the coil 32a and the coil 32b, a light scanning is performed. Namely, the light scanning operates, by reflecting a light beam L, outputted from a light source (not shown) to the optical deflecting device 1, from the mirror 23, while rotating the deflecting member 20. Note that, in this embodiment, the light source and the optical deflecting device 1 are arranged so that the light beam L is directed to the center of the mirror 23 of the deflecting member 20 (i.e. the center C of the sphere S).

Note also, that the optical deflecting device 1 is provided with a stopper (not shown), which prevents the deflecting member 20 from inadvertently being removed from the opening 11 of the supporting member 10, even if the current, flowing through the coils 32a and 32b of the driving mechanisms 30a and 30b, exceeds a magnitude sufficient to drive the deflecting member 20 so that separation occurs.

Figure 7:
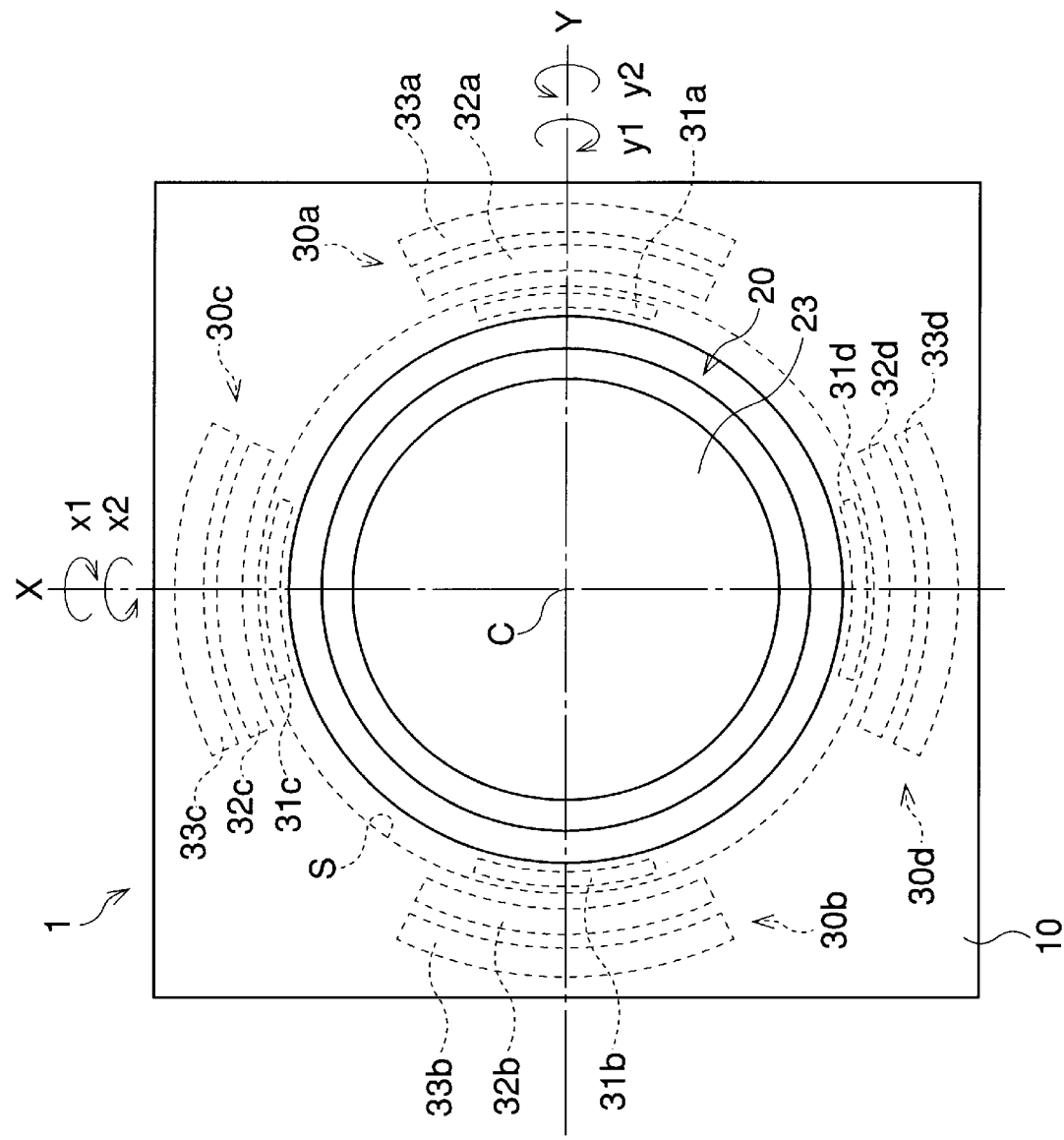
FIG. 7 is a plan view of the optical deflecting device.

FIG. 7 is a plan view showing the optical deflecting device 1 from the side at which the mirror 23 is placed. In this embodiment, the optical deflecting device 1 is provided with four driving mechanisms. On each of perpendicular two axes, the X axis and the Y axis, two driving mechanisms are provided. A point of intersection of the X axis and the Y axis is the center C of the sphere S. The driving mechanisms are equidistant from the point of intersection of the axes. Namely, on the X axis, the driving mechanism 30c and the driving mechanism 30d are equidistant from the center C, and on the Y axis, the driving mechanism 30a and the driving mechanism 30b are also equidistant from the center C. The driving mechanism 30c and the driving mechanism 30d have a structure similar to the driving mechanism 30a and the driving mechanism 30b shown in FIG. 4. Namely, the driving mechanism 30c has a magnet 31c, a coil 32c and a yoke 33c; and the driving mechanism 30d has a magnet 31d, a coil 32d and a yoke 33d.

The deflecting member 20 is rotated around the X axis and the Y axis, by controlling the direction and magnitude of the current flowing through the coils of each of the driving mechanisms. The rotation around the X axis is controlled by the driving mechanism 30a and the driving mechanism 30b, and the rotation around the Y axis is controlled by the driving mechanism 30c and the driving mechanism 30d.

When using the optical deflecting device 1, the light beam performs a two-dimensional scanning, as described below. The light beam is directed to the center C, while simultaneously rotating the deflecting member 20 around the X axis, in the direction x1 or x2 using the driving mechanisms 30a and 30b, and around the Y axis, in the direction y1 or y2 by the driving mechanisms 30c and 30d. By controlling the direction and the angle of rotation around the X axis and the Y axis to sequentially position the deflecting member 20 at a predetermined orientation, the light beam performs a two-dimensional scanning.

Further, the light beam can perform a two-dimensional scanning in another manner as described below.

First, the deflecting member 20 is rotated around the X axis in the direction x1 to a first predetermined angle. And then, keeping the deflecting member 20 positioned at the first predetermined angle, the light beam is directed to the center C, and the deflecting member 20 executes a single rotation around the Y axis, in the directions y1 and y2, so that the scanning of one line is performed. Next, the deflecting member 20 is rotated further around the X axis, in the direction x1, to a second redetermined angle, and keeping the deflecting member 20 positioned at the second predetermined angle, the light beam is directed to the center C, and the deflecting member 20 executes a single rotation around the Y axis, in the directions y1 and y2, so that the scanning of the next one line is performed. Such an operation, as described above, is performed repeatedly, so that a two-dimensional optical deflection scanning, which is conventionally performed in a televison, a printer and so on, is executed.

In this embodiment, the optical deflection scanning is performed two-dimensionally, by rotating the plane mirror 23, on which the light beam is deflected, around two perpendicular axes. Accordingly, the structure of the optical deflecting device 1 is simple and compact.

Further, in this embodiment, the light beam is directed to the center C, which is the point of intersection of the X axis and the Y axis. Namely, the position on the mirror 23, to which the light beam is directed, does not alter, when the deflecting member 20 is rotated around the X axis or the Y axis. Accordingly, the two-dimensional optical scanning can be controlled accurately.

Furthermore, a pitch of the scanning line can be easily and accurately controlled by regulating the magnitude of the current flowing through the coils.

Note that, in this embodiment, the optical deflecting device 1 is provided with four driving mechanisms, however the number of the driving mechanisms is not restricted to four. At least one driving mechanism may be provided on each intersecting axes, so that the deflecting member 20 can be rotated around each of the axes.

Further, in this embodiment, the X axis and the Y axis lie in a plane perpendicular to a tangent on the mid-point of the arced inner surface 11*a* of the opening 11, however the direction of the X axis and the Y axis is not restricted to such a plane.

Furthermore, in this embodiment, the plane mirror 23 is placed at the center of the deflecting member 20, however the position of the plane mirror 23 is not restricted to the center of the deflecting member 20. The plane mirror 23 may be placed at any portion on the deflecting member 20, by which the light beam can perform a two-dimensional scanning.

The present disclosure relates to subject matter contained in Japanese Patent Application No. 09-028355 (filed on Jan. 28, 1997) which is expressly incorporated herein, by reference, in its entirety.

I claim:

1. A two-dimensional optical deflecting device comprising:

an optical deflecting member in which an arced wall portion corresponds to a spherical annulus, a center of which is a point of intersection of two axes, and in which a light beam reflecting portion is provided;

a supporting member having an opening portion, said arced wall portion of said optical deflecting member being in slidable contact with said opening portion; and driving mechanism being provided on each of said two axes;

wherein said driving mechanism controls a position of said optical deflecting member.

2. A two-dimensional optical deflecting device according to claim 1, wherein said driving mechanism comprises a magnet located in said optical deflecting member, and a yoke and a coil located in said supporting member, said coil being placed in the magnetic flux formed between said magnet and said yoke.

3. A two-dimensional optical deflecting device according to claim 2, wherein a curvature of said magnet is coincident with a curvature of said arced wall portion.

4. A two-dimensional optical deflecting device according to claim 2, wherein a curvature of said yoke is coincident with a curvature of said arced wall portion.

5. A two-dimensional optical deflecting device according to claim 1, wherein said driving mechanism controls said position of said optical deflecting member by rotating said optical deflecting member around said two axes.

6. A two-dimensional optical deflecting device according to claim 1, wherein said two axes are perpendicular.

7. The two-dimensional optical deflecting device according to claim 6, wherein said light beam reflecting portion is a plane mirror.

8. The two-dimensional optical deflecting device according to claim 7, wherein a light beam is directed onto and reflected by said surface of said plane mirror at said point of intersection.

9. The two-dimensional optical deflecting device according to claim 6, wherein said driving mechanisms are placed equally distantly from said point of intersection.

10. The two-dimensional optical deflecting device according to claim 6, wherein a plurality of said driving mechanisms are provided on each of said two axes.

11. The two-dimensional optical deflecting device according to claim 6, wherein said arced wall portion is ring-shaped.

12. A two-dimensional optical deflecting device according to claim 1, wherein said light beam reflecting portion is a plane mirror.

13. A two-dimensional optical deflecting device according to claim 12, wherein a light beam is directed onto and reflected by said surface of said plane mirror at said point of intersection.

14. A two-dimensional optical deflecting device according to claim 5, wherein said plane mirror is circular.

15. A two-dimensional optical deflecting device according to claim 1, wherein said driving mechanisms are placed equidistantly from said point of intersection.

16. A two-dimensional optical deflecting device according to claim 1, wherein a plurality of said driving mechanisms are provided on each of said two axes.

17. A two-dimensional optical deflecting device according to claim 1, wherein said arced wall portion is ring-shaped.

* * * * *